United States Patent [19]

Kuno et al.

[11] 4,046,998

[45] Sept. 6, 1977

[54] POSSIBLE VEHICLE RUNNING DISTANCE INDICATION

[75] Inventors: Akira Kuno, Nagoya; Yoshio Shinoda, Okazaki; Hiroshi Arai, Toyota, all of Japan

[73] Assignees: Nippon Soken, Inc., Nishio; Toyota Jidosha Kogyo Kabushiki Kaisha, Toyota, both of Japan

[21] Appl. No.: 654,963

[22] Filed: Feb. 3, 1976

[30] Foreign Application Priority Data

Feb. 11, 1975 Japan .................................. 50-17178

[51] Int. Cl.² .......................................... G01M 13/26
[52] U.S. Cl. .................................. 235/150.21; 73/113; 235/92 FL
[58] Field of Search ........ 235/150.21, 92 MT, 92 FL, 235/615; 73/113, 114, 432

[56] References Cited

U.S. PATENT DOCUMENTS

| 2,783,940 | 3/1957 | Hartman | 235/150.21 |
| 3,029,632 | 4/1962 | Nistri | 73/113 |
| 3,589,176 | 6/1971 | Wellons | 73/113 |
| 3,983,372 | 9/1976 | Klaver | 235/150.21 |

Primary Examiner—Malcolm A. Morrison
Assistant Examiner—Errol A. Krass
Attorney, Agent, or Firm—Cushman, Darby & Cushman

[57] ABSTRACT

Indication of possible vehicle running distance with remnant fuel is accomplished by measuring the fuel amount, the fuel consumption and the running distance and calculating the possible remaining running distance with remnant fuel. The indication is directly based on the current driving condition so that the driver can know the possible running distance with remnant fuel in continued driving under similar conditions. The indication can prevent fuel shortage and also teach a driver economic driving.

7 Claims, 10 Drawing Figures

POSSIBLE VEHICLE RUNNING DISTANCE INDICATION

BACKGROUND OF THE INVENTION

1. Field of the Invention

This invention relates to possible vehicle running distance indication and more particularly to indication of a possible vehicle running distance available for the remnant fuel in continued running.

2. Description of the Prior Art

In driving a vehicle, the driver looks at a fuel meter and decides from his experience how far he will be able to drive the vehicle. However, driving on a special road such as a highway, a driver occasionally runs short of fuel due to lack of experience.

SUMMARY OF THE INVENTION

This invention is made in consideration of the above problem.

An object of this invention is to provide a method and an apparatus for indicating possible vehicle running distance with remnant fuel (residual running range), and for teaching the driver both how far he can go with the remnant fuel and how to drive economically.

Another object of this invention is to provide a method and an apparatus for indicating possible vehicle running distance by measurement of the remnant fuel and the running conditions at that time.

DESCRIPTION OF THE PREFERRED EMBODIMENTS

Figure 1:
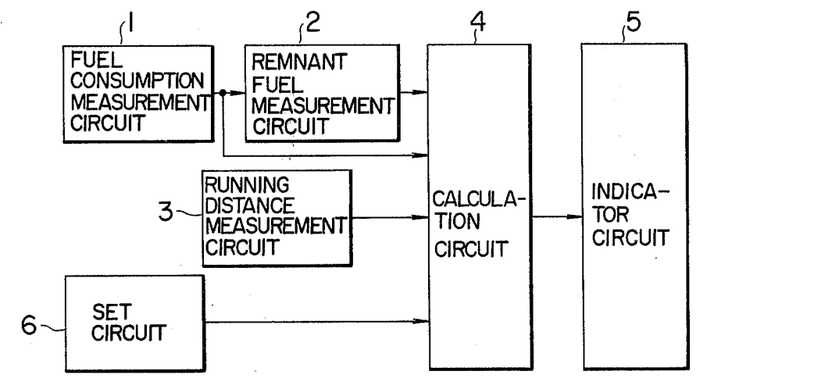
FIG. 1 is a block diagram of an embodiment of the possible vehicle running distance meter according to this invention.

A block diagram of the total structure of the possible vehicle running distance meter according to this invention is shown in FIG. 1, in which a fuel consumption measurement circuit 1 measures the fuel consumption of an internal combustion engine equipped in a vehicle and supplies a consumption signal to a remnant fuel measurement circuit 2 and to a calculation circuit 4. For measuring the fuel consumption, such methods can be adopted as the fuel flow amount measuring method, fuel suction pressure and revolution measuring method, fuel injection pulse signal measuring method, etc. The remnant fuel measurement circuit 2 calculates the remnant fuel in a fuel tank on the basis of said fuel consumption signal and supplies a remnant fuel signal to the calculation circuit 4. A running distance measurement circuit 3 measures the running distance of the vehicle and supplies a distance signal to the calculation circuit 4. The calculation circuit 4 calculates the distance which can be covered using the remnant fuel in the fuel tank on the basis of said remnant fuel signal and said distance signal and supplies an output signal and an indicator circuit 5. The indicator circuit 5 is preferably installed in front of the driver's seat of the vehicle. The initiation time of the calculation circuit 4 is determined by a set circuit 6.

Next the respective components of the structure of FIG. 1 will be described in more detail referring to the respective figures.

Figure 2:
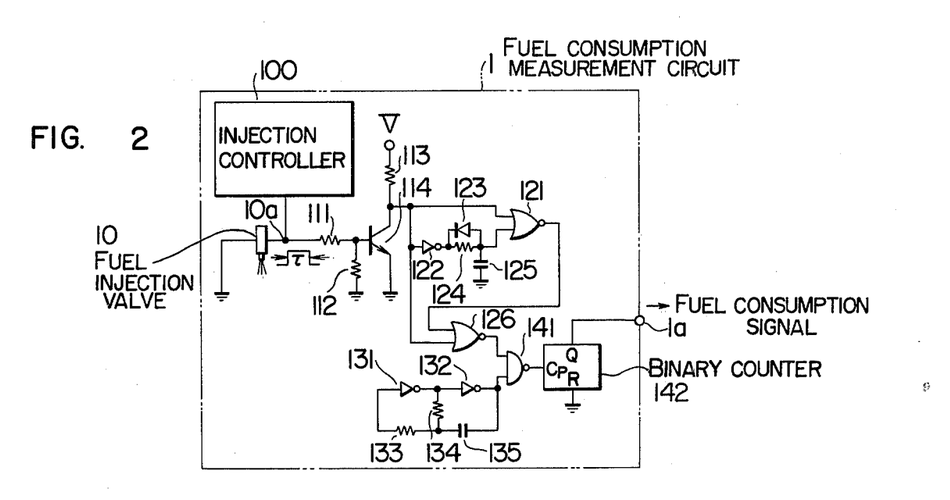
FIG. 2 is a circuit diagram of the fuel consumption measurement circuit in FIG. 1.

FIG. 2 shows an electric circuit diagram of the fuel consumption measurement circuit 1. In the circuit 1, a fuel injection valve 10 is actuated by injection signals applied to a terminal 10a from an injection controlling circuit 100 with a time width $\tau$ adjusted in correspondence with a required fuel amount in the engine, controlling the fuel supply to the engine. The structure and operation of these parts are well known and the detailed description thereof is dispensed with here. The injection signal is also supplied through a buffer circuit comprising resistors 111, 112 and 113 and an input buffering transistor 114 and a delay circuit for canceling the response time lag of the fuel injection valve 10 with respect to the injection signal comprising NOR gates 121 and 126, an inverter 122, a resistor 124, a diode 123 and a capacitor 125 to a conversion circuit comprising a NAND gate 141 and a binary counter 142 (IC CD4020A manufactured by RCA). The NAND gate 141 also receives a clock signal of a fixed frequency supplied from an oscillation circuit comprising inverters 131 and 132, resistors 133 and 134 and a capacitor 135. The frequency of the oscillation circuit and a terminal Q of the binary counter 142 are so arranged that a 1 level pulse signal (consumption signal) is generated at a terminal 1a at every consumption of 1 cc. of fuel.

Figure 3:
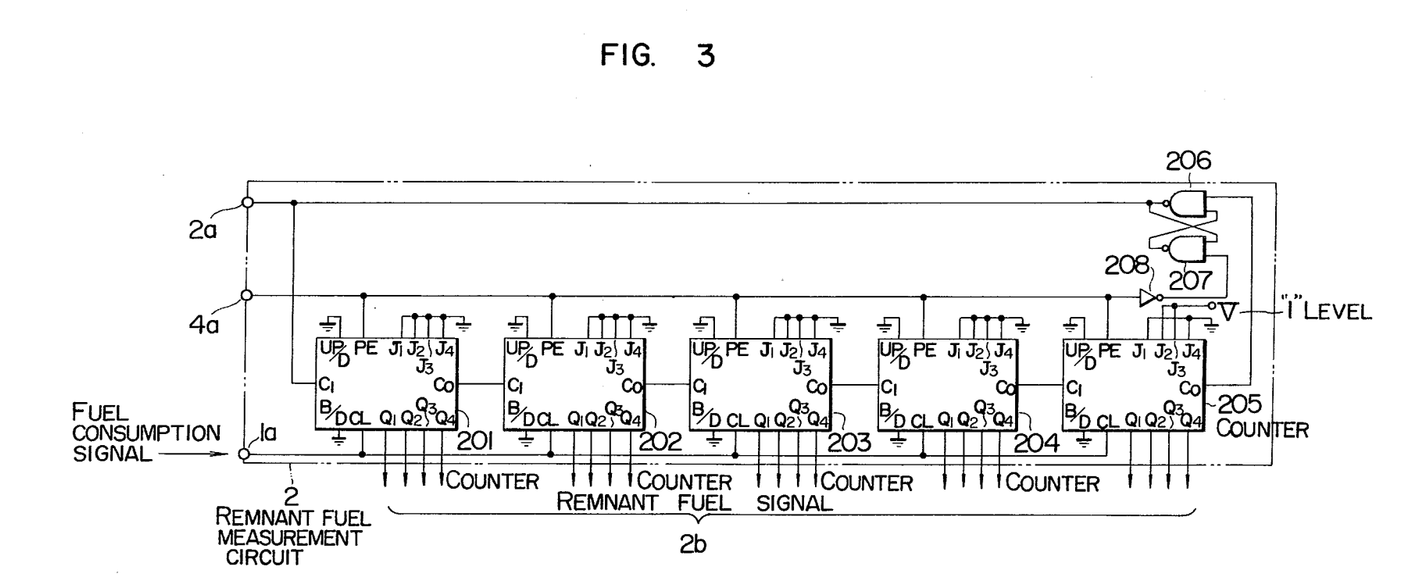
FIG. 3 is a circuit diagram of the remnant fuel measurement circuit in FIG. 1.

The consumption signal from the circuit of FIG. 2 is supplied to the remnant fuel measurement circuit 2 as shown in FIG. 3. In this figure, presettable reversible counters (CD 4029 manufactured by RCA, referred to simply as reversible counters hereinbelow) 201, 202, 203, 204 and 205 are connected in cascade. The count control terminals (UP/D) of the respective reversible counters 201, 202, 203, 204 and 205 are grounded to perform reverse counting (subtraction). In the present embodiment, the capacity of the fuel tank (not shown), i.e. a predetermined fuel amount, is assumed to be 60 liters (60,000 cc). Among the respective input terminals $J_1$, $J_2$, $J_3$ and $J_4$ of the reversible counters, only the input terminals $J_2$ and $J_3$ of the reversible counter 205 are applied with a voltage V (1 level). The reversible counters 205, 204, 203, 202 and 201 are preset to the binary decimal code (reference signal) of (0110), (0000), (0000), (0000) and (0000) corresponding to 60,000 cc. Further, the CL terminals of the reversible counters 201, 202, 203, 204 and 205 are connected to the terminal 1a of the fuel consumption measurement circuit 1 for counting the consumption signal. The $C_o$ output of the final stage reversible counter 205 is connected to one input of an R-S flip-flop consisting of NAND gates 206 and 207. The output of the R-S flip-flop is connected to the input of the first stage reversible counter 201. The PE terminals of the reversible counters 201, 202, 203, 204 and 205 are connected to the other input terminal of the R-S flip-flop through an inverter 208. With these connections, at the time when a terminal 4a (to be described in more detail referring to FIG. 5) becomes 1 level, the reversible counters 201, 202, 203, 204 and 205 stores the capacity of the fuel tank, 60 liters. The 1 level at the terminal 4a is applied through the inverter 208 and the R-S flip-flop to the $C_1$ input of the reversible counter 201 as a 0 level. The $C_o$ output of the reversible counter 205 is at 1 level. Each time when a pulse arrives at the terminal 1a from the fuel consumption measurement circuit 1, the reversible counters 201, 202, 203, 204 and 205 perform reverse counting (subtraction) and generate a binary decimal code (remnant signal) at their outputs $Q_1$, $Q_2$, $Q_3$, and $Q_4$ corresponding to the remnant fuel in the fuel tank. For example, when 5679 pulses have arrived at the terminal 1a, the remnant fuel in the fuel tank is 54,321 cc, and the reversible counters 205, 204, 203, 202 and 201 provide a binary decimal code of (1010), (0010), (1100), (0100) and (1000) at the respective ($Q_1Q_2Q_3Q_4$) outputs. When the remnant fuel is null or O cc, the reversible counters 201, 202, 203, 204 and 205 all provide (0000), (0000), (0000), (0000) and (0000) at the ($Q_1Q_2Q_3Q_4$) outputs. At this moment, the $C_o$ output of the reversible counter 205 also becomes 0 level. This 0 level is inverted in the R-S flip-flop and appears at the terminal 2a as 1 level.

Figure 4:
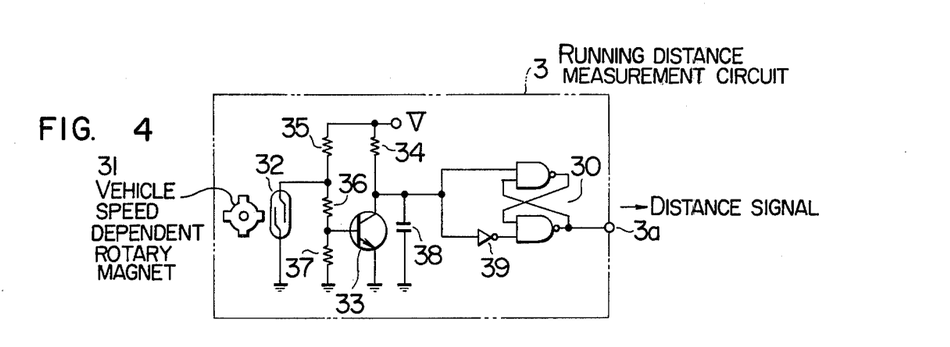
FIG. 4 is a circuit diagram of the running distance measurement circuit in FIG. 1.

The running distance (distance covered) of the vehicle is measured in the running distance measurement circuit 3 shown in FIG. 4. A magnet 31 is rotated by the speed meter cable of the vehicle and a reed switch 32 is disposed in the vicinity thereof. The on-off operation of the reed switch 32 is done by the rotation of the magnet 31. Thus, a number of pulses proportional to the wheel revolutions, i.e. the running distance, of the vehicle are generated. The circuit following the reed switch 32 and consisting of a transistor 33, resistors 34, 35, 36 and 37, a capacitor 38, an inverter 39 and an R-S flip-flop 30 is provided for shaping the pulses. In this embodiment, 2548 pulses (distance signal) are supplied to a terminal 3a in a run of 1 kilometer.

Figure 5:
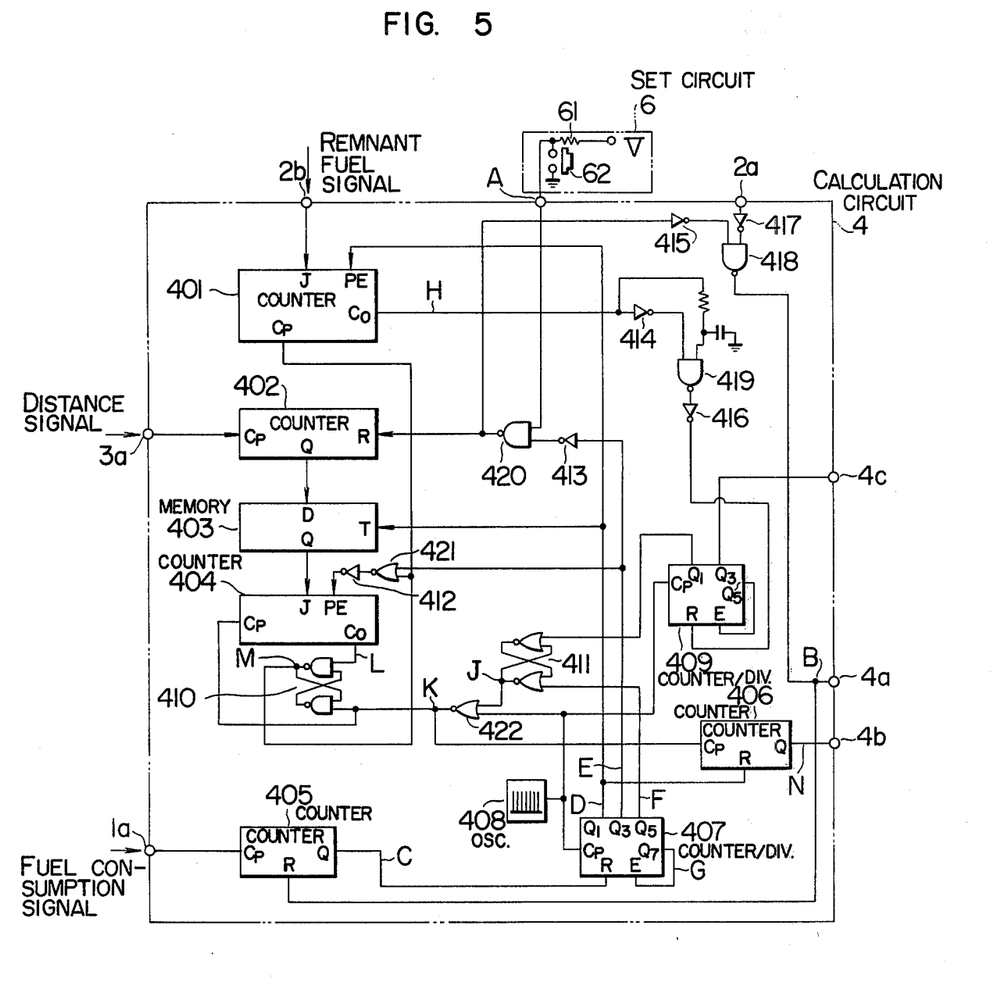
FIG. 5 is a circuit diagram of the calculation circuit in FIG. 1.
Figure 6:
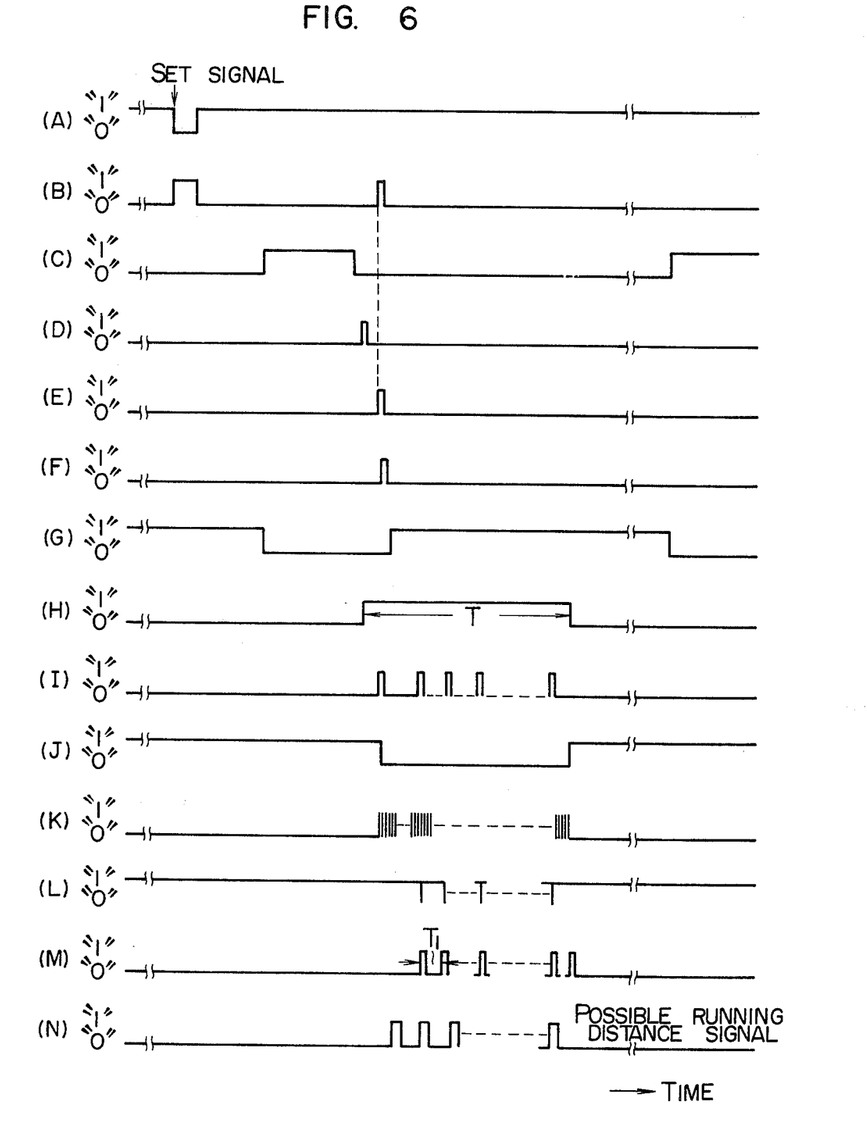
FIG. 6 is a signal waveform chart of waves at the various portions of the calculation circuit of FIG. 5 for illustrating the operation of the circuit.

FIG. 5 shows a detailed structure of the calculaton circuit 4 and the set circuit 6, and the signal waveforms (A) to (N) in FIG. 6 are those at points A to N in FIG. 5. The set circuit 6 comprises a resistor 61 and a set switch 62. When the set switch 62 is closed automatically or manually upon the filling of the fuel tank, a set signal of 0 level is generated at the point A as shown by the waveform (A) in FIG. 6. The calculation circuit 4 comprises presettable reversible counters 401 and 404 (each of which is formed similar to the reversible counters 201, 202, 203, 204 and 205 of FIG. 3 but is represented by a single reversible counter), binary counters 402, 405 and 406, a memory 403, decade counter/divider (RCA CD4017) 407 and 409, an oscillator 408, and R-S flip-flop 410 consisting of two NAND gates, an R-S flip-flop 411 consisting of two NOR gates, inverters 412, 413, 414, 415, 416 and 417, NAND gates 418, 419 and 420 and NOR gates 421 and 422, and calculates a possible running distance with the remnant fuel upon each consumption of a predetermined amount of fuel. Next, the operation of the calculation circuit 4 will be described.

When the set circuit 6 generates a set signal of 0 level as shown by the waveform (A) in FIG. 6, the NAND gate 420 generates a pulse of 1 level to reset the binary counter 402. At the same time, the NAND gate 418 generates a pulse of 1 level at the terminal 4a of the circuit 4 or the point B as shown by the waveform (B) in FIG. 6 to reset the binary counter 405. The pulses arriving at the terminal 1a from the fuel consumption measurement circuit 1 are frequency-divided by the binary counter 405, for example into 1/1000, to generate a 1 level pulse at the point C at energy fuel consumption of 1000 cc (1 liter) as shown by the waveform (C) in FIG. 6 to reset the counter 407 provided with a decimal divider. Then, when the point C becomes again 0 level, the counter 407 begins counting of the clock pulses of a constant frequency supplied from an oscillator 408, and generates, in sequence, a pulse of 1 level at $Q_1$, $Q_3$ and $Q_5$ outputs, i.e. at points D, E and F, as shown by the waveforms (D), (E) and (F) in FIG. 6. When $Q_7$ output i.e. point G, becomes 1 level as shown by the waveform (G) in FIG. 6, this pulse enters terminal E and stops counting of the clock pulses. The $Q_7$ output is held at 1 level until the point C becomes 1 level again. Thus, when a 1 level signal is generated at the $Q_1$ output of the counter 407, PE terminal of the reversible counter 401 becomes 1 level. Since the output terminal 2b of the remnant fuel measurement circuit 2 (twenty terminals as shown in FIG. 3 but shown as one terminal for simplification) is connected with J terminal (preset input terminal) of the reversible counter 401, the reversible counter 401 reads in a binary decimal code corresponding to the remnant fuel L as the preset value, and gives a 1 level signal at the $C_o$ output as shown in waveform (H) in FIG. 6. The binary counter 402 which is reset by the closure of the set switch 62 of the set circuit 6 or by the generation of a 1 level signal at the $Q_3$ output of the counter 407 begins counting pulses generated at terminal 3a of the running distance measurement circuit 3, and generates the count value at Q output. When the counter 407 generates a 1 level signal at the $Q_1$ output, the count is stored by the memory 403. Thus, the stored content in the memory 403 is the distance N covered by the vehicle with the consumption of a unit fuel of 1 liter. The binary code generated by the memory 403 is proportion to the distance N can be read in by the reversible counter 404 as the preset value when the counter 407 generates a 1 level signal at the $Q_3$ output.

Next, when the counter 407 generates a 1 level signal at the $Q_5$ output, the $C_o$ output of the reversible counter 401, i.e. point H, is at 1 level as described before and the counter 409 provided with a decimal divider have the R terminal (reset terminal) at 0 level and counts the clock pulses from the oscillator 408 to generate 0 level at the $Q_1$ output. Thus, the output of the R-S flip-flop 411, i.e. point J, inverts to 0 level as shown by waveform (J) in FIG. 6 and the clock pulses from the oscillator 408 appear at the output of the NOR gate 422, i.e. point K, as shown by the waveform (K) of FIG. 6 and are applied to the $C_p$ input of the reversible counter 404. The reversible counter 404 performs reverse counting (subtraction) by these clock pulses. When the subtraction result becomes zero, a 0 level is generated at the $C_o$ output, i.e. the point L, as shown by the waveform (L) in FIG. 6, and the point M becomes 1 level for inverting the R-S flip-flop 410. This 1 level is applied through the NOR gate 421 and the inverter 412 to the PE terminal of the reversible counter 404, the reversible counter 404 reads in again the content of the running distance N stored in the memory 403 and supplies a 1 level at the $C_o$ output again. Then, the output of the R-S flip-flop 410, i.e. the point H, becomes 0 level again. In this way, the reversible counter 404 repeats the above procedure during the application of the clock pulses at the $C_p$ input. Thus, there appear a plurality of 1 level pulses at the point M as shown by the waveform (M) of FIG. 6. Here, the period $T_1$ of this pulse is proportional to the memory content (running distance N) of the memory 403 and an equation $T_1 = K_1.N$ ($K_1$ being a constant) can be held. Here, this pulse signal is a first conversion signal representing the running distance per unit fuel (1 liter). The point H becomes 0 level as shown by the waveform (H) of FIG. 6 when the pulse generated at the point M is applied to the $C_p$ input of the reversible counter 401, the reversible counter 401 performs reverse counting, and the memory content of the counter becomes zero. This 0 level signal is inverted through the NAND gate 419 and the inverter 416 to become a 1 signal. After resetting, the counter 409 counts the clock pulses from the oscillator 408 and renders the $Q_1$, $Q_3$ outputs to 1 level successively. Thus, the R-S flip-flop 411 is inverted and the output, the point J, becomes 1 level again as shown by the waveform (J) of FIG. 6. Then, since the clock pulse from the oscillator 408 is cut off by the NOR gate 422, the reversible counter 404 stops the above operation. In short, since a plurality of pulses are generated at the point M and applied to the reversible counter 401 during the time period T when the $C_o$ output of the reversible counter 401, i.e. the point H is at 1 level and the period T is proportional to the preset value of the reversible counter 401 (remnant fuel L) and to the period $T_1$ of the pulse generated at the point M, an equation $T = K_2.L.T_1 = K_1.K_2.L.N = L.N$ (setting $K_1.K_2 = 1$) can be derived. In this time interval $T_1$ the clock pulses of the oscillator 408 are counted by the binary counter 406 and pulses divided at a predetermined ratio are generated at the Q output, the point N, as shown by the waveform (N) of FIG. 6. Since the number of these pulses is proportional to the time interval $T_1$, the number of pulses appearing at the terminal 4b for the time interval T represents the possible running distance I to be covered by the vehicle with the remnant fuel L by selecting the frequency dividing ratio, for example $K = 1/2548 \times 1000$. Thus, the calculation circuit 4 having a structure as shown in FIG. 5 estimates the remaining possible running distance I by the multiplication of the remnant fuel L and the running distance per unit fuel consumption (1 liter) N.

Figure 7:
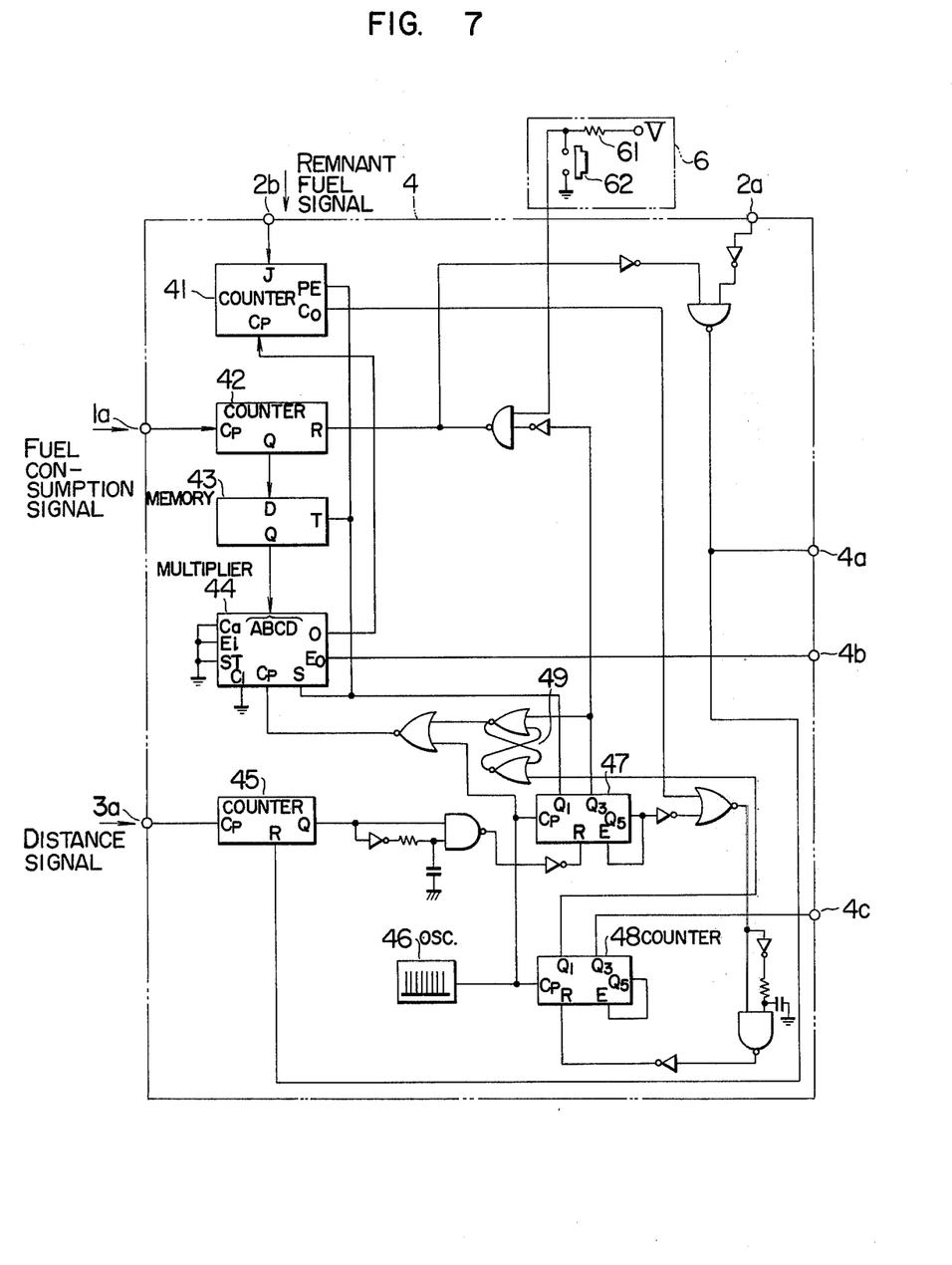
FIG. 7 is a circuit diagram of another embodiment of the calculation circuit in FIG. 1.

Alternatively, the calculation circuit 4 may perform the division $I = L/L'$ at each predetermined running distance (e.g. 1 Km) to provide the possible running distance I by dividing the remnant fuel L by the fuel L' consumed by the running of the unit distance, and the embodiment thereof is shown in FIG. 7. In FIG. 7, when the distance signal arrives at a terminal 3a from the running distance measurement circuit 3, it is frequency-divided to 1/2548 in a binary counter 45, which generates one 1 level pulse at the Q output for each kilometer. A counter 47 provided with a decimal divider is reset by a momentary application of a 1 level pulse and $Q_1$, $Q_3$ and $Q_5$ outputs thereof becomes 1 level successively. When the $Q_1$ output becomes 1 level, the reversible counter 41 stores the remnant fuel signal generated at a terminal 2b by the remnant fuel measurement circuit 2, and a memory 43 stores the number of fuel signal pulses generated in the running of 1 Km proportional to the fuel consumption arriving at a terminal 1a which are counted by a binary counter 42. Thus, the output signal of the memory 43 is a second conversion signal expressing the fuel consumption per 1 kilometer running. At the same time, a proportionality factor multiplier 44 (MC 14527 made by MOTOROLA), is set also. Then, when the $Q_3$ output of the binary counter 47 is driven to 1 level, the output of the R-S flip-flop 49 consisting of NOR gates becomes 0 level and the clock pulse from an oscillator 46 arrives at the $C_p$ input of the proportionality factor multiplier 44. Since the Q output of the memory 43 is connected with the data inputs A, B and C of the proportionality factor multiplier 44, for example if the memory content of the memory 43 is (3), the $E_o$ terminal of the proportionality factor multiplier 44 becomes 1 level each time when the $C_p$ input receives 10 pulses and the O terminal thereof generates three pulses of 1 level. Therefore, the reversible counter 41 becomes less by three from the preset value. In this way, the subtraction continues until the content of the reversible counter 41 becomes zero. When the memory content of the reversible counter 41 becomes zero, the $C_o$ output thereof become 0 level momentarily and the counter 48 provided with a decimal divider begins counting of the clock pulses after resetting to generate 1 level at the $Q_1$, $Q_3$ and $Q_5$ outputs successively. Thus, when the $Q_1$ output of the counter 48 becomes 1 level, the R-S flip-flop 49 is inverted to prevent the arrival of the clock pulses at the $C_p$ input of the proportionality factor multiplier 44 and at the same time the generation of the pulse at the terminal 4b. Next, when the $Q_3$ output becomes 1 level, a memory signal of 1 level is generated at the terminal 4c. This operation is repeated each time when the binary counter 45 generates 1 level at the Q output, i.e. at each run of 1 kilometer. The number of pulses generated at the terminal 4b by this one operation is proportional to the preset value of the reversible counter 41 (remnant fuel amount L), and inversely proportional to the memory content of the memory 43 (fuel consumption per 1 kilometer run L'). Thus, the calculation circuit 4 provides the possible running distance I = L/L'.

Figure 8:
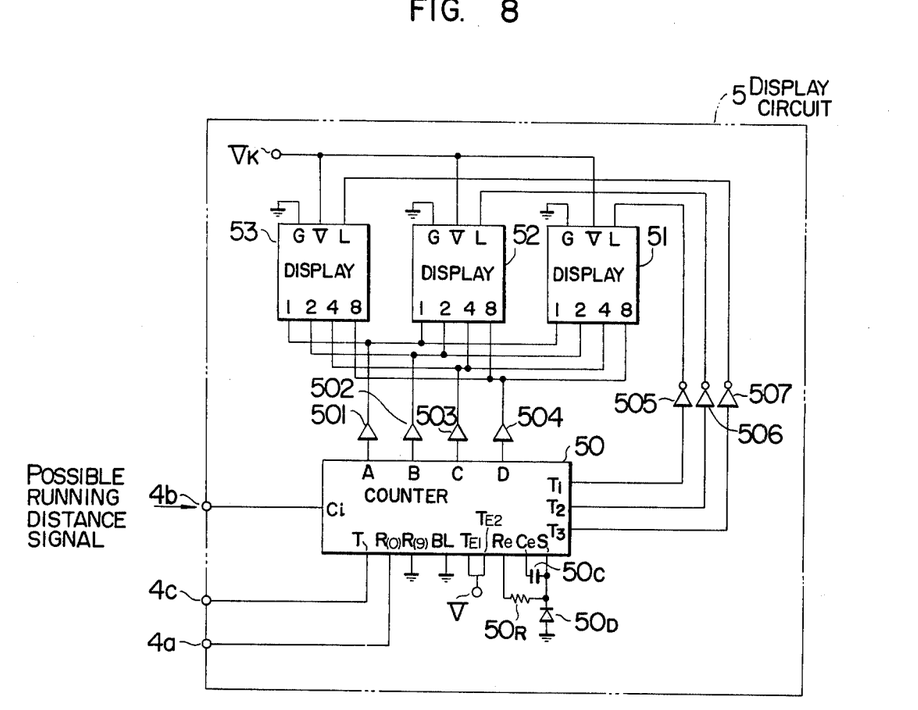
FIG. 8 is a circuit diagram of the indicator circuit in FIG. 1.

The indicator circuit 5 for displaying or indicating the calculated possible running distance I is shown in FIG. 8, in which a 4-digit decimal counter 50 (TC 500010 made by Tokyo Shibaura Electric Co., Ltd.) is connected through buffering non-inverters 501, 502, 503 and 504 and inverters 505, 506 and 507 to electroluminescence (light emitting) diode numerical indicators 51, 52 and 53 (5082-7300 made by Yokogawa Hewlett Packard Co., Ltd.). A resistor 50R, a diode 50D and a capacitor 50C are also connected to the counter 50 for controlling the oscillation frequency.

When a reset signal of 1 level arrives at the terminal 4a from the calculation circuit 4, the counter 50 is reset and then counts the signal arriving at the terminal 4b corresponding to the possible running distance I. When the terminal 4c becomes 1 level, the counter 50 stores the count and generates a binary code at output terminals A, B, C and D corresponding to the count. At the same time, the counter 50 generates signals at digit selection outputs $T_1$, $T_2$ and $T_3$ in synchronism with the respective digits. Thus, if the count of the counter 50 is 135, the numerical display elements 51, 52 and 53 display (5), (3) and (1) respectively and the driver can know that the possible running distance with remnant fuel is 135 kilometers.

Figure 9:
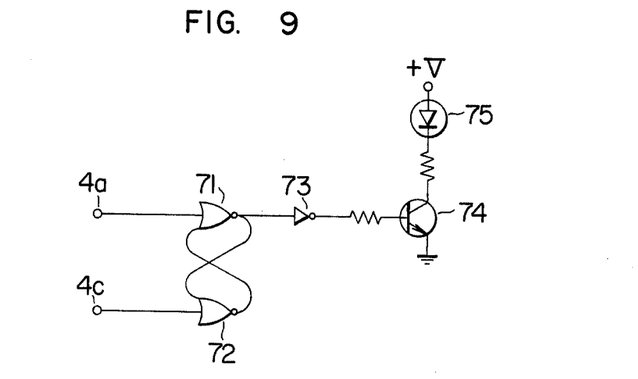
FIG. 9 is a circuit diagram of an indicator circuit in FIG. 1.

In the above embodiment, the initiation time of calculation is set by the set circuit 6 and hence the driver may misunderstand that display until the first run of the predetermined distance (for example, 1 kilometer) or the predetermined fuel consumption (for example, 1 liter) is achieved. This misunderstanding can be prevented by the employment of an indicator circuit having a structure as shown in FIG. 9. Namely, when the initiation time of calculation is set by the set circuit 6, a pulse of 1 level is generated at a terminal 4a. And when one operation of the calculation circuit 4 is ended and the display circuit 5 begins display operation, a pulse of 1 level is generated at a terminal 4c. Between these moments, the output of the R-S flip-flop consisting of NOR gates 71 and 72 is held at 0 level and an inverter 73 produces 1 level. Thus, a transistor 74 becomes conductive and an electroluminescent diode (light emitting diode) 75 luminesces. By connecting the output of the inverter 73 with the BL (blanking) terminal of the counter 50 shown in FIG. 8, the electroluminescence diode 75 luminesces only during the time from the setting of the initiation time of calculation to the end of one calculation and the display of the display circuit 5 begins at the turn-off of the electroluminescent diode 75 to prevent the misunderstanding of the driver.

Figure 10:
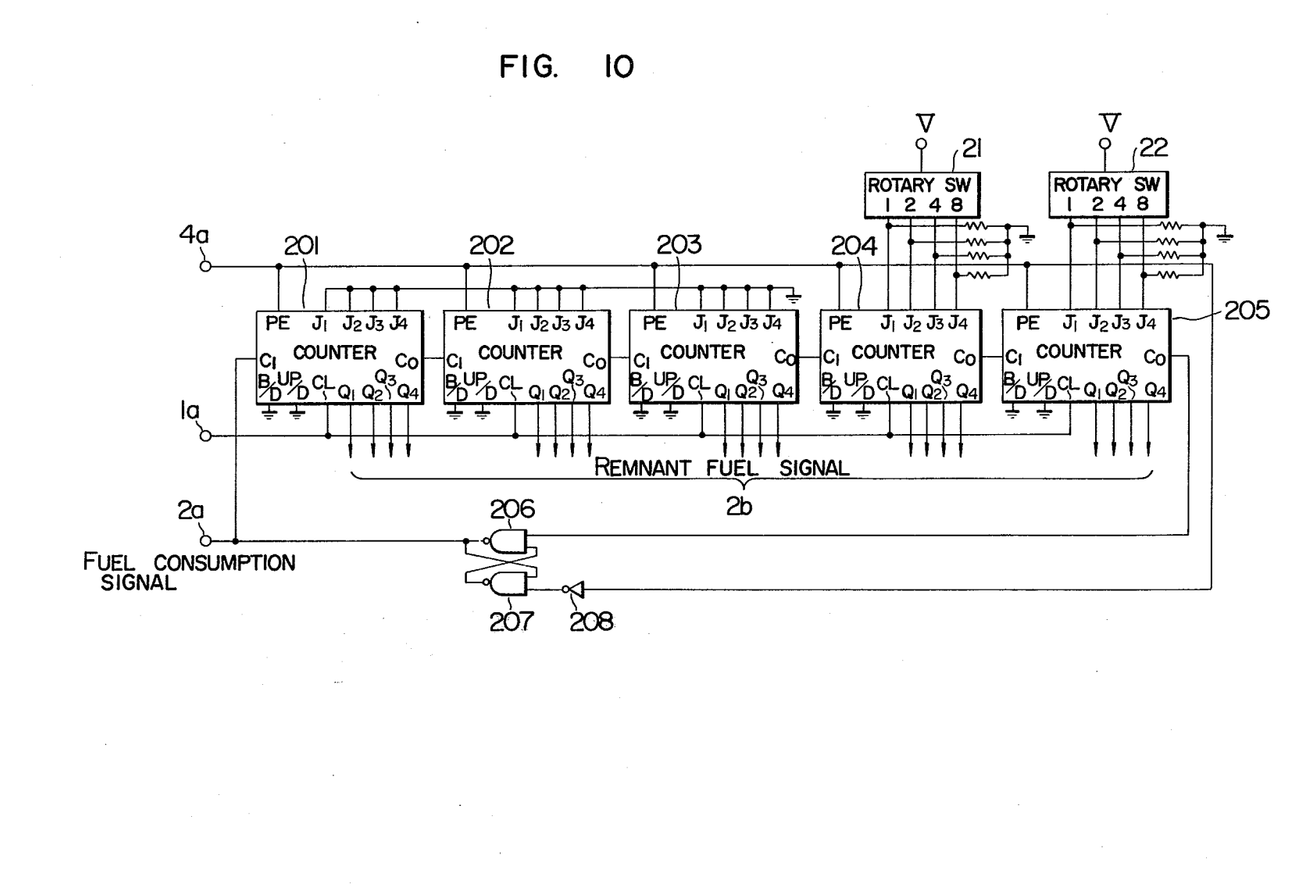
FIG. 10 is a circuit diagram of another embodiment of the remnant fuel measurement circuit in FIG. 1.

Further, although in the above embodiment, the present value of the reversible counters 201, 202, 203, 204 and 205 in the remnant fuel measurement circuit 2 is assumed to be always constant (60,000 cc), the preset value may be arranged to be arbitrarily settable according to necessity. FIG. 10 shows an embodiment in which similar parts to those of FIG. 3, are denoted by similar numerals and 10-position switches 21 and 22 (rotary switch 435005-1 made by AMP Inc.) are connected with $J_1$, $J_2$, $J_3$ and $J_4$ terminals of the reversible counters 204 and 205. Further, the remnant fuel may be measured directly from the liquid surface in the fuel tank. Further, the methods of remnant fuel measurement, running distance measurement and calculation are not restricted to those of the above embodiment, and other embodiments of the invention, modification thereof, and alternative thereto will be obvious to those skilled in the art may be made without departing from the present invention.

We claim:

1. A method of indicating a remaining possible vehicle running distance available on the remnant fuel of a vehicle comprising the steps of:
   measuring the amount of fuel consumed;
   measuring the remnant fuel amount in a fuel tank;
   measuring the running distance the vehicle has run;
   storing the measured remnant fuel amount when either one of the measured consumed fuel amount and the measured running distance has reached a predetermined value;
   generating a train of pulses after said storing step, one cycle period of the train of pulses being determined by the other one of the measured consumed fuel amount and the measured running distance;
   calculating a time interval in which the number of pulses in the train of pulses reaches the stored remnant fuel amount, said time interval being proportional to a remaining possible running distance available on the stored remnant fuel amount; and
   indicating the calculated remaining possible running distance by an indicator.

2. A method of indicating a remaining possible vehicle running distance available on the remnant fuel of a vehicle according to claim 1, wherein the step of measuring the remnant fuel amount includes subtracting the consumed fuel amount from a predetermined fuel amount.

3. A method of indicating a remaining possible vehicle running distance available on the remnant fuel of a vehicle according to claim 1, wherein said step of calculating the time interval representing the remaining possible vehicle running distance includes the steps of calculating a running distance per unit fuel amount and multiplying the running distance per unit fuel amount by the remnant fuel amount.

4. A method of indicating a remaining possible vehicle running distance available on the remnant fuel of a vehicle according to claim 1, wherein said step of calculating the time interval representing the remaining possible vehicle running distance includes the steps of calculating a fuel amount consumed per unit running distance, and dividing the remnant fuel amount by the fuel amount consumed per unit running distance.

5. An apparatus for indicating a remaining possible vehicle running distance available on the remnant fuel of a vehicle comprising:
   fuel consumption measuring means for generating a consumption signal each time the consumed fuel amount reaches a first predetermined value;
   running distance measuring means for generating a distance signal each time the distance the vehicle runs reaches a second predetermined value;
   remnant fuel measuring means for generating a remnant signal representing the remnant fuel amount in a fuel tank;
   first counting means for counting the number of said consumption signals generated by said fuel consumption measuring means;
   second counting means for counting the number of said distance signals generated by said running distance measuring means;
   control means from generating a control signal each time the count value of either one of said first counting means and said second counting means reaches a predetermined value;
   memory means for memorizing the value of said remnant signal generated by said remnant fuel measuring means when said control signal is generated by said control means;
   clock generating means for repetitively generating a clock signal at an interval corresponding to the count value of the other one of said first counting means and said second counting means when said control signal is generated by said control means;
   subtracting means responsive to the output of said clock generating means for subtracting the number of said clock signals from the value of said remnant signal memorized by said memory means until the subtraction result is equal to zero;
   converting means for proportionally converting the interval in which the memorized value of said remnant signal is subtracted to zero by said subtracting means into a remaining possible vehicle running distance available on the remnant fuel; and
   indicating means for indicating the remaining possible vehicle running distance.

6. An apparatus for indicating a remaining possible vehicle running distance available on the remnant fuel of a vehicle according to claim 5, further comprising a set circuit for producing a set signal to reset said first and second counting means upon starting the operation of the apparatus.

7. An apparatus for indicating a remaining possible vehicle running distance available on the remnant fuel of a vehicle according to claim 6, further comprising a display circuit having a light emitting means and connected to the output of said converting means in parallel with said indicating means for displaying inoperativeness of the indicating means.

* * * * *